United States Patent [19]

Delanoy et al.

[11] Patent Number: 5,222,155
[45] Date of Patent: Jun. 22, 1993

[54] COMPUTER APPARATUS AND METHOD FOR FUZZY TEMPLATE SHAPE MATCHING USING A SCORING FUNCTION

[75] Inventors: Richard L. Delanoy, Waltham; Jacques G. Verly, Wayland, both of Mass.

[73] Assignee: Massachusetts Institute of Technology, Cambridge, Mass.

[21] Appl. No.: 899,107

[22] Filed: Jun. 15, 1992

Related U.S. Application Data

[63] Continuation of Ser. No. 675,311, Mar. 26, 1991, abandoned.

[51] Int. Cl.$^5$ ............................................. G06K 9/62
[52] U.S. Cl. ......................................... 382/30; 382/34
[58] Field of Search .................. 382/30, 34, 41, 48

[56] References Cited

U.S. PATENT DOCUMENTS

| | | | |
|---|---|---|---|
| 4,672,678 | 6/1987 | Koezuka et al. | 382/30 |
| 4,718,102 | 1/1988 | Crane et al. | 382/30 |
| 4,799,270 | 1/1989 | Kim et al. | |
| 4,805,225 | 6/1989 | Clark . | |
| 4,837,842 | 6/1989 | Holt | 382/30 |
| 4,845,610 | 10/1989 | Parvin . | |
| 4,949,392 | 8/1990 | Barski et al. | 382/30 |
| 4,958,375 | 9/1990 | Reilly et al. . | |
| 5,014,327 | 5/1991 | Potter et al. | 382/30 |
| 5,052,045 | 9/1991 | Peregrim et al. | 382/30 |

OTHER PUBLICATIONS

Zadeh, L. A., *Information and Control*, 8(3): pp. 338-353 (1965).
Serra, J., *Image Analysis and Mathematical Morphology*, Academic Press, London (1982), pp. i-ix and 1-33.
Verly, J. G., et al., *Proc. of IEEE-IECEJ-ASJ, Int'l Conf. on Acoustics, Speech and Signal Proc.*, Apr. 7-11, 1986, pp. 1457-1460.
Verly, J. G., et al., *Proc. of Workshop on Computer Vision*, Miami Beach, Fla., Nov. 30-Dec. 2, 1987, pp. 244-246.
Williams, B. D., et al., *Proc. of the Active Systems IRIS Conf.*, Aug. 1988, pp. 1-16.
Dudgeon, D. E., et al., *Proc. of the DARPA Image Understanding Workshop* Palo Alto, Calif., May 23-26, 1989, pp. 479-506.
Verly, J. G., et al., *Proc. of the 3d Int'l Conf. on Computer Vision*, Osaka, Japan, Dec. 4-7, 1990, 9 pages.
Jain, A. K., *Fundamentals of Digital Image Proc.*, Prentice Hall, Englewood Cliffs, N.J. (1989) pp. 400-402.

*Primary Examiner*—Jose L. Couso
*Attorney, Agent, or Firm*—Hamilton, Brook, Smith & Reynolds

[57] ABSTRACT

Computer apparatus and method in a computer system provides shape matching. A template of a desired shape is matched to a subset of points in a subject image. The matching is determined according to an arbitrarily complex function of image point values and template point values followed by an arbitrary operation on the plurality of results of the arbitrarily complex function. In the case of fuzzy template matching, the operation is the average preferably followed by clipping to the range [0, 1] for defining fuzzy membership values. The arbitrarily complex function may be formed of a discrete array of single variable functions or single variable lookup tables.

28 Claims, 4 Drawing Sheets

COMPUTER APPARATUS AND METHOD FOR FUZZY TEMPLATE SHAPE MATCHING USING A SCORING FUNCTION

GOVERNMENT SUPPORT

The following was supported by DARPA TTO under contract number F19628-90-C-0002. Under this contract the U.S. Government has certain rights to the present invention.

This is a continuation of co-pending application Ser. No. 07/675,311, filed on Mar. 26, 1991, now abandoned.

BACKGROUND OF THE INVENTION

As used herein "$f(\vec{x})$", refers to a general class of n dimensional signals or value measurements (e.g. light intensity, voltage level, temperature, height, weight, etc.) where $\vec{x}=(x_1, \ldots x_n)$ is a vector in n dimensional space. Although applicable to arbitrary values of n, the following discussion assumes n=2 for ease of illustration and comprehension. In this simpler context, $f(\vec{x})$ is a function defined over the usual (x,y) plane, and f is referred to as an image, even in the case where x and y take continuous (non-discrete) values. Thus, $\vec{x}$ refers to some location in an image. In the discretized case, $\vec{x}$ refers to a particular pixel in a real image.

In addition, "$g(\vec{y})$" refers to a class, generally preestablished, of n dimensional values where $\vec{y}=(y_1, \ldots y_n)$ is a vector in n dimensional space. In particular, $g(\vec{y})$ serves as a standard against which $f(\vec{x})$ is measured for purposes of image processing, and especially pattern matching as discussed next.

A large class of image processing operations involve moving a "kernel" g (variously called a window, template, or stencil) over an image f and performing an operation on the pairs of points that are superimposed at each relative displacement of f and g. This is illustrated in FIG. 1, where the point in f being probed is $\vec{x}$. The kernel is positioned over the image such that the kernel origin (or reference point) coincides with $\vec{x}$. Each point $\vec{y}$ of g, is defined with respect to the kernel origin. The set of points over which g is defined is denoted by Ros(g), i.e. region of support of g. Note that Ros(g) may be a rectangle as shown in FIG. 1 or the set of points defining a more complex shape (as shown in FIG. 2). In FIG. 1 it is clearly seen that a kernel point $\vec{y}$ coincides with the image point $\vec{x}+\vec{y}$. Consequently, the pairs of values to be considered at each point $\vec{y} \in Ros(g)$ are $f(\vec{x}+\vec{y})$ and $g(\vec{y})$.

This common framework is employed by three traditional shape matching techniques: template matching by cross correlation, function mathematical morphology (MM) dilation, and function MM erosion. In each case, the value of g have the same dimensionality as the values of f (e.g., f and g may both have units of temperature, range, etc.). In the following equations, $\oplus$ and $\ominus$ are the symbols for Minkowski addition and Minkowski subtraction, respectively. The symbol $\breve{g}$ indicates the symmetric function of g, i.e., $\breve{g}(\vec{x})=g(-\vec{x})$.

In cross correlation, the values $f(\vec{x}+\vec{y})$ and $g(\vec{y})$ considered at each kernel point $\vec{y} \in Ros(g)$ are multiplied, and the sum (or integral) of the f and g value pair products defines the final outcome of the template matching. Restated as an equation, cross correlation matching, i.e. $cc(\vec{x})$, is defined as follows:

$$cc(\vec{x}) = [f*g](\vec{x}) = \sum_{\vec{y}} \{f(\vec{x}+\vec{y})g(\vec{y})\}, \vec{y} \in Ros(g). \quad \text{Equation 1}$$

In function MM dilation, the values $f(\vec{y}+\vec{y})$ and $g(\vec{y})$ considered at each kernel point $\vec{y} \in Ros(g)$ are summed together, and the maximum f and g value pair sum defines the final outcome of the template matching. Expressed as an equation, function MM dilation matching, i.e. $md(\vec{x})$, is defined as follows:

$$md(\vec{x})=[f \oplus g](\vec{x})=MAX_{\vec{y}}\{f(\vec{x}+\vec{y})+g(\vec{y})\}, \vec{y} \in Ros(g). \quad \text{Equation 2}$$

In function MM erosion, the difference of the values $f(\vec{x}+\vec{y})$ and $g(\vec{y})$ considered at each kernel point $\vec{y} \in Ros(g$ is computed, and the minimum f and g value pair difference is used as the final outcome of the template matching. The equation defining function MM erosion, i.e. $me(\vec{x})$, reads:

$$me(\vec{x})=[f \ominus g](x)=MIN_{\vec{y}}\{f(x+y)-g(y)\}, y \in Ros(g). \quad \text{Equation 3}$$

One disadvantage of template (kernel) matching by cross correlation and MM is that these methods are easily confounded by distortions of shapes within images due to a variety of causes e.g., noise, occlusion (i.e., obscuration), articulation (of shape parts), etc. In the case of noise, methods for reducing noise in images are known but also change those portions of original image data which are noise free. Thus, such image noise reduction methods create a further loss in integrity in image processing.

Despite the lack of robustness, template matching by cross correlation has found application in the recognition of printed characters and the inspection of printed circuit boards (see A. K. Jain, *Fundamentals of Digital Image Processing,* New Jersey: Prentice-Hall, Inc., 1989, p. 402), and edge detection in medical images. And despite similar limitations, MM is a widely used tool for image processing (see J. Serra, *Image Analysis and Mathematical Morphology,* New York: Academic Press, 1982).

A further disadvantage of the existing template matching techniques, especially in image processing, is the computational expense in terms of processing time.

Accordingly there is a need for more efficient and robust shape matching apparatus and/or method.

SUMMARY OF THE INVENTION

The present invention provides a shape matching method and apparatus which overcome the problems of prior art. In particular, the present invention provides a generalized template matching computer method and apparatus which employ arbitrarily complex relationships between working pair values of $f(\vec{x}+\vec{y})$ and $g(\vec{y})$ instead of the standard operations (i.e. *, +, or −) used in the prior art. Through careful design of the arbitrarily complex relationships, templates of the preferred embodiment can perform object recognition, feature extraction, or shape filtering under conditions not possible, or at best very difficult, with shape/template matching tools of the prior art. These conditions include:

1. Noisy sensors.
2. Uncertainty in image values.
3. Partial object occlusion.
4. Articulated objects.

5. Objects that may appear in multiple configurations.

Further, preferred embodiment templates for some objects are constructed with sufficient detail to accomplish reliable object recognition directly from pixel-level data. Consequently, for some applications, very simple computer vision systems with only a few processing steps are possible, saving software development time and software errors inherent in managing complex programs. In addition, the simplicity of the present invention template processing makes it particularly suited for massively parallel implementation. Furthermore, expense may be markedly reduced by implementing the arbitrarily complex relationships as lookup tables, and by using masks constructed with a prior knowledge of objects and scenes to avoid probing pixels that are unlikely locations for objects.

In a preferred embodiment of the present invention computer apparatus for shape matching is employed in a computer system. In particular, a template of a desired shape is coupled to a digital processor. The template has a plurality of points, each point having a predetermined value. A subject image is held in a working memory area of the digital processor. The subject image is formed of a plurality of points, each point having a respective measurement value. Processor means executable by the digital processor match shape of the template to a subset of points of the subject image held in the working memory area. Said matching generates an output image having a plurality of points, each output image point having a respective value.

Specifically, for each point in the subject image the processor means determines a corresponding point in the output image according to an arbitrarily complex function. In one embodiment, the template provides, for each template point, an arbitrarily complex function for use by the processor means to determine output image points values. The processor means employs a parameter pair to call (i.e., as input to) the arbitrarily complex function. The parameter pair is formed of one image point measurement value and one template point generally predetermined value. Thus, for each subject image point, the processor means determines value of a corresponding output image point according to an arbitrarily complex function of measurement values of a subset of points in the subject image and generally predetermined values of points in the template.

In a preferred embodiment, the arbitrarily complex function is formed of a plurality of single variable functions, one function for each possible predetermined value of a template point. Other single variable functions are suitable. Further the processor means determines a corresponding output image point according to an arbitrarily complex operation on a multiplicity of results from the arbitrarily complex function. Preferably the operation includes a mathematical average of the results from the arbitrarily complex function over the number of points in the template. In addition, preferably the operation generates an output image point value in the range 0 to 1, or a range of numbers mapped to the range [0, 1].

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

By way of overview, Applicants have recognized that the lack of robustness in prior template matching techniques stems from the use of only standard operations (*, +, or −) in the relationships between pair values of $f(\bar{x}+\bar{y})$ and $g(\bar{y})$ per kernel or image position $\bar{x}$. To that end, the present invention provides a user definable function s(a, b) to define arbitrarily complex relationships between f and g values, where operand a equals the value of $f(\bar{x}+\bar{y})$ and operand b equals the value of $g(\bar{y})$. Function s is referred to as the scoring function of the present invention.

In turn, the present invention defines a generalized form (equation) of template matching hereinafter called "shape matching", sm(x), in terms of the arbitrarily complex function s as follows:

$$sm(\bar{x}) = O_{\bar{y}}^n \{s(f(\bar{x}+\bar{y}), g(\bar{y}))\}, \bar{y} \in Ros(g).$$  Equation 4

This equation states that the operator O processes the set of values produced by the 2-D function s as $\bar{y}$ explores Ros(g). It is noted:
1. For O≡Σ and s(a,b)=ab, Eq. 4 reduces to Eq. 1.
2. For O≡MAX and s(a,b)=a+b, Eq. 4 reduces to Eq. 2.
3. For O≡MIN and s(a,b)=a−b, Eq. 4 reduces to Eq. 3.

However, replacing prior art standard operations (i.e. *,+,or −) on a and b with the present invention scoring function s(a,b) allows for the definition of arbitrarily complex relationships between values of $f(\bar{x}+\bar{y})$ and $g(\bar{y})$. The power of this approach is discussed next in a general application of the present invention illustrated in FIGS. 2 through 3b. Following that discussion is a specific application of the present invention described with reference to FIGS. 4 through 5c.

Figure 2:
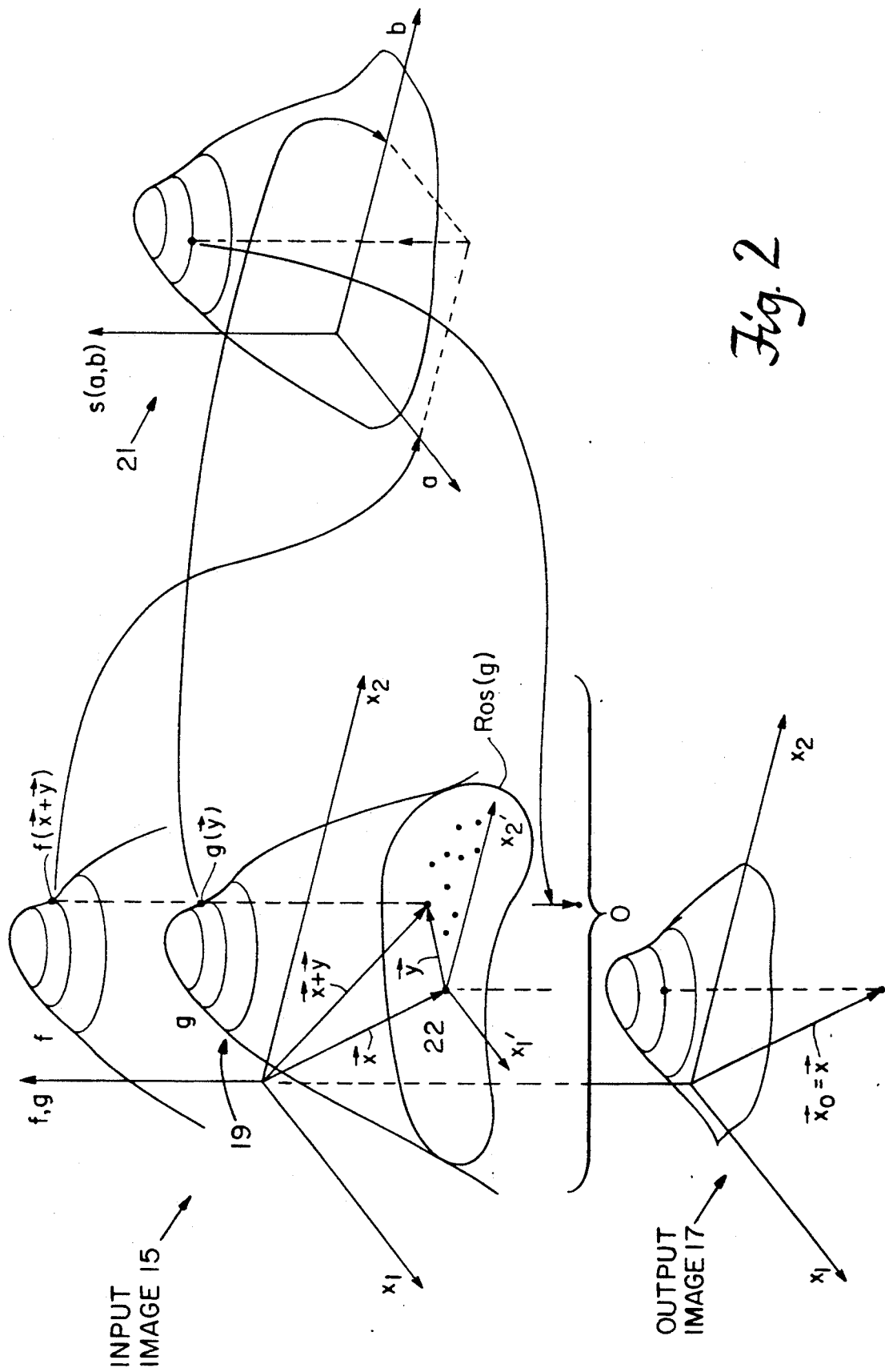
FIG. 2 is a schematic illustration of the present invention shape matching.

Referring to FIG. 2, a subject input image is generally shown at 15. The image input is two-dimensional and lies in the x1–x2 plane illustrated in FIG. 2. For each point or position in the image 15, there is an associated value defined by $f(\bar{x})$ and indicated along an axis orthogonal to the x1 and x2 axes. Illustrating the input image f 15 in this manner allows for various cases of image input signals from video signals to radar signals, where the values of $f(\bar{x})$ are temperature measurements, linear dimension measurements, mass measurements and the like. That is, this approach allows for n-dimensional image input signals.

A template g 19 is applied to the input image 15 one image point $\bar{x}$ at a time. In particular, the template g 19 defines a region in the x1'–x2' coordinate system which is designated Ros(g), i.e. the region of support of g. The region is formed of a reference point referred to as the template origin 22 and a plurality of points $\vec{y}$ spaced from the template origin 22. For each point in the region of support of the template g 19, there is a value defined by $g(\vec{y})$ and indicated along an axis orthogonal to the x1' and x2' axes.

Operation of the template g 19 on an input image 15 is then as follows and outlined in FIG. 3b. For a given point $\vec{x}$ in the input image 15, the template g 19 is positioned such that the template origin 22 corresponds with the position of the subject point $\vec{x}$ in the x1-x2 plane. This step is indicated at 47 in FIG. 3b. For each point $\vec{y}$ in the region of support of template g 19, the values of $f(\vec{x}+\vec{y})$ and $g(\vec{y})$ are obtained. A variable "a" is then set equal to the obtained value of $f(\vec{x}+\vec{y})$, and variable "b" is set equal to the obtained value of $g(\vec{y})$ as shown at 49 in FIG. 3b. Variables a and b are then used as operands in the scoring function s(a,b). That is, a call to the scoring function s 21 with the assigned values of a and b is made and produces a scoring function value. This is illustrated in FIG. 2 where the input variables a and b are indicated along respective axes a and b of the scoring function s 21 and the resulting function value is indicated along an axis perpendicular to the a and b axes.

This resulting s function value is stored in a buffer 31 (FIG. 3a) and the foregoing calculations of $f(\vec{x}+\vec{y})$, $g(\vec{y})$ and s(a,b) where $a=f(\vec{x}+\vec{x})$ and $b=g(\vec{y})$ are repeated for each point $\vec{y}$ in the region of support of the template g 19. As a result, for each $\vec{y} \in Ros(g)$ there is a resulting scoring function value held in the buffer 31. The multiplicity of values held in the buffer 31 are then operated on by an operation O such as a mathematical average, the maximum, or the minimum, or the like as shown at 51 in FIG. 3b. The outcome of the operation O provides the value of a output image point $\vec{x}_o$ corresponding to the given input image point $\vec{x}$. The template 19 is similarly applied to each point $\vec{x}$ in the input image 15 to produce, through scoring function s and ultimately operation O, values for corresponding points $\vec{x}_o$ in the output image 17. To that end template g, scoring function s and operation 0 define output image 17 from a subject input image 15. From the output image 17, various patterns and shapes are presented as recognized or matched in the input image 15 with respect to the template g.

Figure 3B:
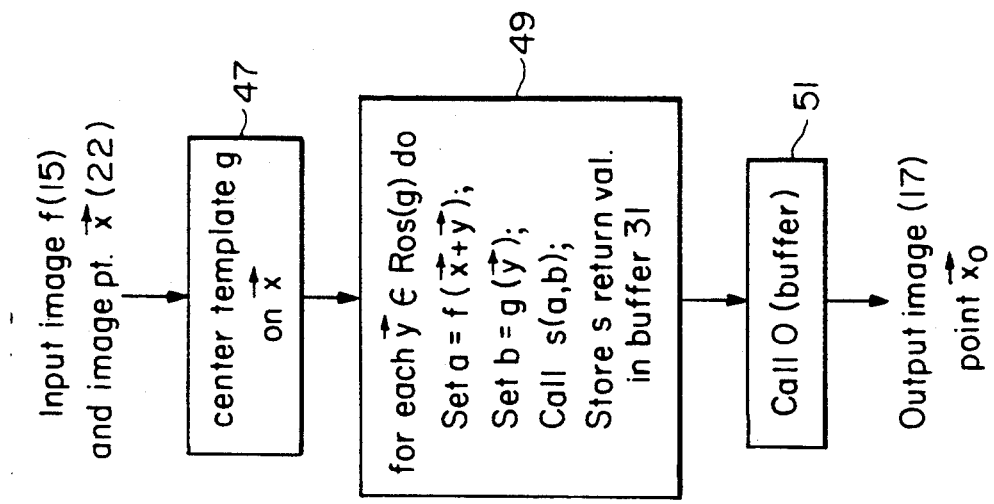
FIGS. 3a through 3b are a block diagram and flow chart respectively of a computer system embodiment of the present invention.
Figure 3A:
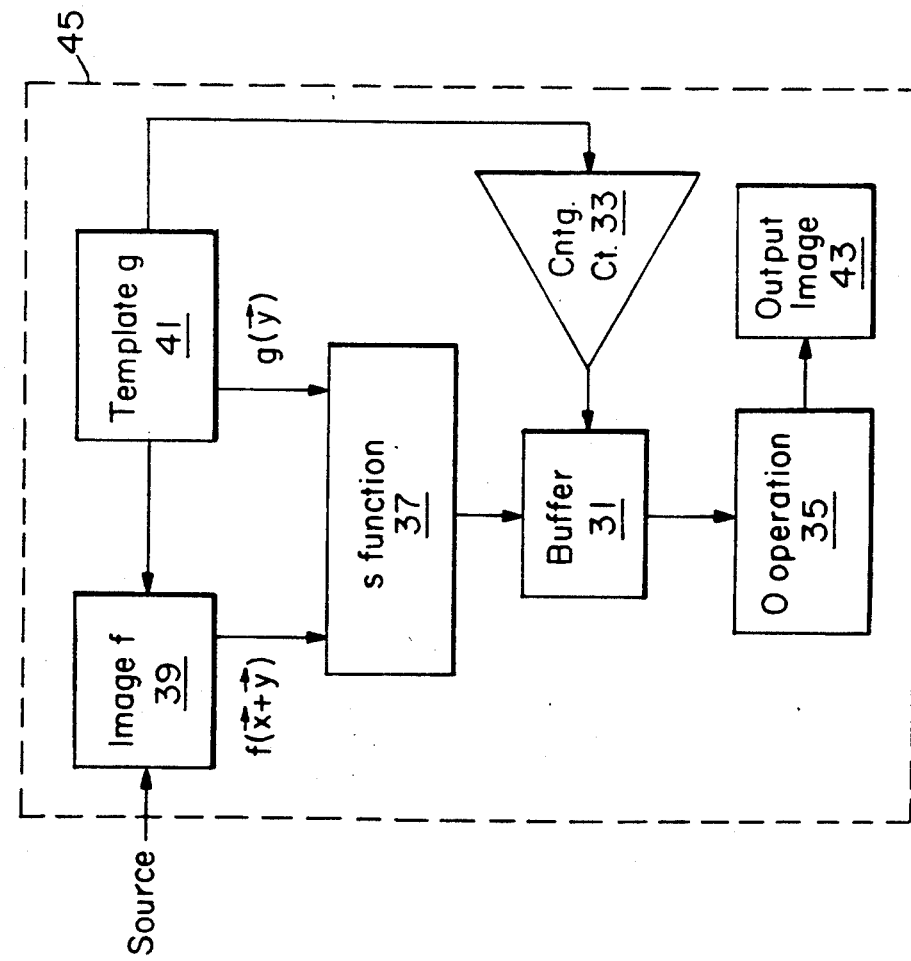

FIGS. 3a and 3b provide a block diagram and flow chart of computer software and/or hardware implementation of the present invention. FIG. 3b is discussed above and FIG. 3a is discussed next. In particular, FIG. 3a schematically diagrams an embodiment of the present invention as held in memory of a digital processor 45 of a computer system. The invention embodiment includes a working memory area 39 for receiving and holding an image f from an image source. Another memory area 41 holds a predetermined template g. Template g is applied to the image f held in the working memory 39. This in turn generates output values $g(\vec{y})$ from the template memory 41 and values $f(\vec{x}+\vec{y})$ from the working memory 39. The two output values are used as inputs to the scoring function held in a register 37 or similar computational memory area (e.g. module, routine or procedure) of the digital processor 45. The output of the s function register 37 is held in a buffer 31. Under the control of counting circuit 33, buffer 31 stores the outputs of the s function register 37 for each $\vec{y}$ in the region of support of template g, for a given $\vec{x}$ placement of template g. After a last point $\vec{y}$ in the region of support of template g, the counting circuit 33 applies the values stored in buffer 31 to the O operation module 35. Output of O operation module 35 is then used to define the point $\vec{x}_o$ in the output image 17 held in memory area 43 and corresponding to the subject point $\vec{x}$ in the input image held in working memory 39. As formed by the foregoing steps, the output image is held in the memory area 43 in a manner which is accessible by the digital processor 45 for display on a display unit or similar output means.

In a preferred embodiment, fuzzy set theory is incorporated with the present invention shape matching described for general application in FIGS. 2 through 3b. By way of background, in classical set theory, membership of an object in a set is denoted either by a 0 or 1. In practice, however set membership is not a binary, either/or condition. To extend the functionality of set theory L. A. Zadeh in "Fuzzy Sets" *Information and Control* No. 3, Vol. 8, June 1965, pages 338–353, introduced the idea of representing set membership as a real number in the range [0,1], permitting varying degrees of membership reflecting uncertainty or contradiction. Fuzzy set membership is calculated by a membership function $f_A(x)$ returning a value in the range [0,1] for a given object x, and representing the "A-ness" of object x. The use of fuzzy set theory has exploded in the last few years, being used extensively, for example, in computer vision, control processes, and artificial intelligence.

In the present invention, a fuzzy template kernel g (described later) is constructed to encode the shape of an object to be sought in image f. In this technique, the scoring function s is implemented as a discrete array of indexed scoring functions, each of which, given a value of $f(\vec{x}+\vec{y})$, returns a match score. As later discussed, individual slices of s for a particular index m (m being a point along the b axis in FIG. 2) are denoted by $s_m(a)$ as an alternative way of expressing s(a,m). The kernel g can then be thought of as a set of labels (or values of m) that specify particular indexed scoring functions appropriate for different locations on the object. In the preferred embodiment, the O operation is the average over points $\vec{y} \in Ros(g)$ and the final output (defining an output image) is defined according to the following two equations. First Equation 5
$$m(x) = \left(\frac{1}{n}\right) = \sum_y \{s(f(x+y),g(y))\}, y \in Ros(g).$$

where n is the number of pixels in the Ros(g) and $O \equiv$ $$\left(\frac{1}{n}\right) \sum_y$$

denotes mathematical average over points $\vec{y}$. Typically, the values returned are at this point approximately in the range [0,1]. However, for several practical reasons, the values returned by each $s_m$ are not restricted to the range [0,1]. Consequently, the value of $m(\vec{x})$ cannot be guaranteed to be in the range [0,1] and needs to be clipped:

$$m'(x) = \begin{cases} 1 & \text{if } m(x) > 1.0 \\ 0 & \text{if } m(x) < 0.0 \\ m(x) & \text{otherwise} \end{cases} \qquad \text{Equation 6}$$

The final output is an image whose values are each a fuzzy membership score representing the degree of belief that the shape encoded in the fuzzy template g is found at each input image location $\underline{x}$.

Given the possibility that the shape represented by a template may be scaled or rotated in the image, the fuzzy membership score may need to be computed with copies of the template that have been appropriately scaled or rotated. Equation 6 handles only the case of scale and rotation invariance. Situations where the shape to be searched in an input image is unconstrained with regard to scaling requires the construction of multiple templates from which a most appropriate copy is selected for probing a particular location $\underline{x}$, depending on the distance to that location. Similarly, situations where the orientation is unconstrained requires the use of multiple templates, each representing a different orientation. In this case, the membership value assigned to a location in the output image is the maximum membership value across all orientations tested.

The following example illustrates the construction and use of fuzzy template correlation in automatic recognition of targets in downlooking laser radar range and intensity images. The scoring functions for the range image use height above ground as the independent variable.

Figures 1, 4:
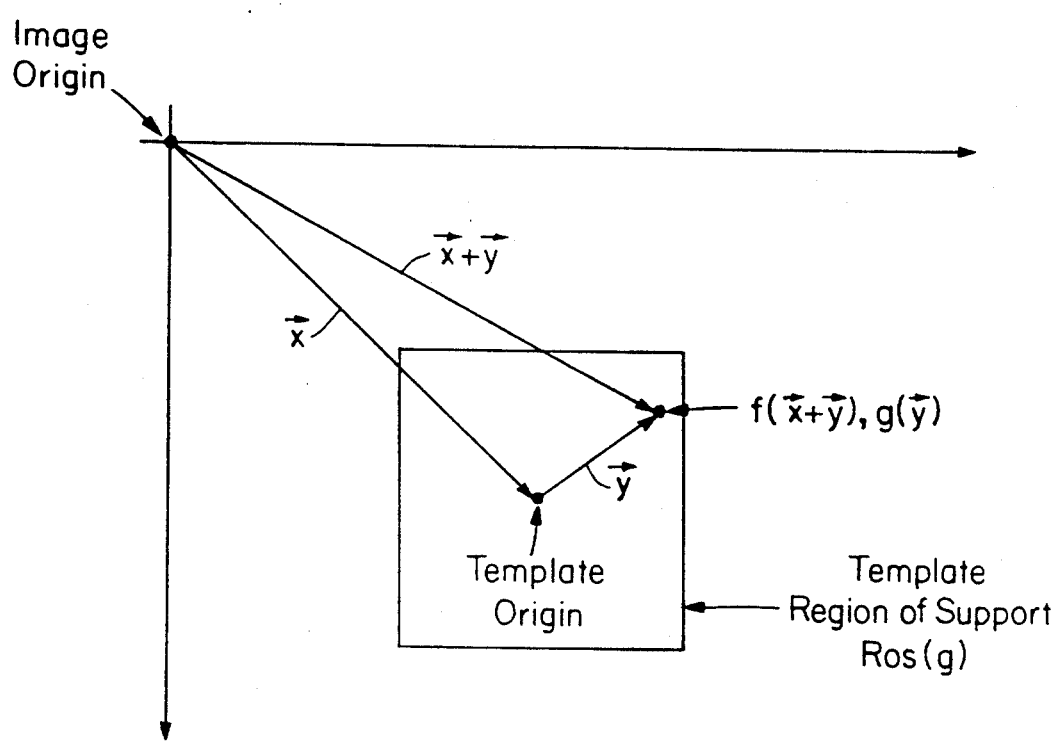
FIG. 1 is a schematic illustration of template matching in the prior art.
FIG. 4 is a schematic illustration of a template g for processing an elongated object in the present invention.

A simple template 60 for an elongated object (a crude model of a semi-truck) with expected height of 3.0 m is constructed as follows and shown in FIG. 4. First, the template function g is constructed as an array of indices (FIG. 4), where 1's indicate the top of the object, 2's indicate locations where ground values are expected, and n indicates a location of uncertainty where no scoring function should be evaluated ( i.e., not in the region of support).

Figure 5A:
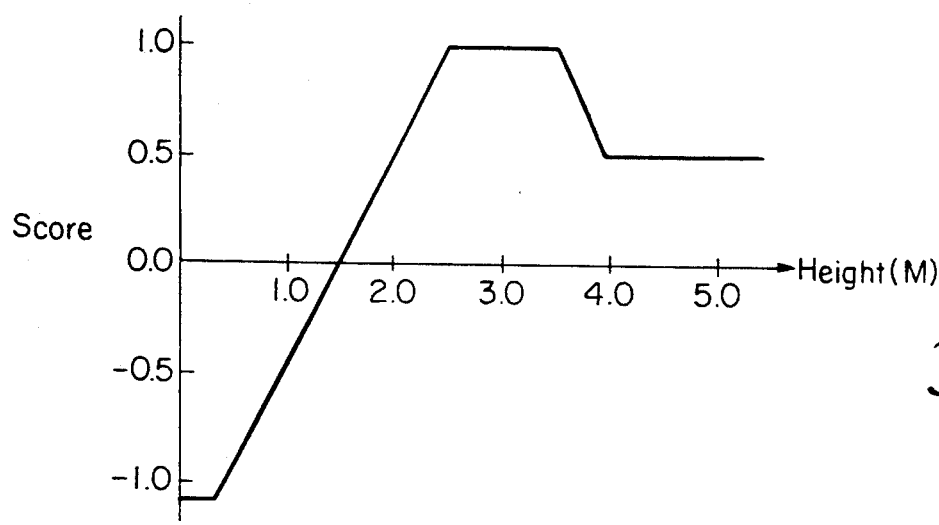
FIGS. 5a through 5c are graphs of scoring functions used for various values along the b axis of the embodiment of FIG. 2.

Then, consider FIG. 5a as the indexed scoring function $s_1(a)$, i.e., s(a,1) of FIG. 2, for the surface expected to be 3.0 m above ground. Image height values in the neighborhood of 3.0 m return a maximum score of 1.0. The width of the maximal scoring interval can be adjusted to adapt to such conditions as sensor accuracy or the variability of surface height found in various instances of the target class. For height values from 2.5 down to 1.5 m, the scoring function returns progressively lower values, reflecting the decreasing confidence that the image height matches the expected surface height. Below 1.5 m, the function $s_1$ returns negative values (the need for negative values is explained later). A similar drop off is evident with heights above 3.5 m. Note however that the minimum returned value for heights above the expected surface height is 0.5, a completely ambiguous score reflecting the fact that surfaces with heights above 3.0 m may be occluding the object. Consequently, a sufficiently large surface that is 5.0 m above ground will elicit a target membership score of 0.5, reflecting the possibility that the target might be totally concealed underneath.

Figure 5B:
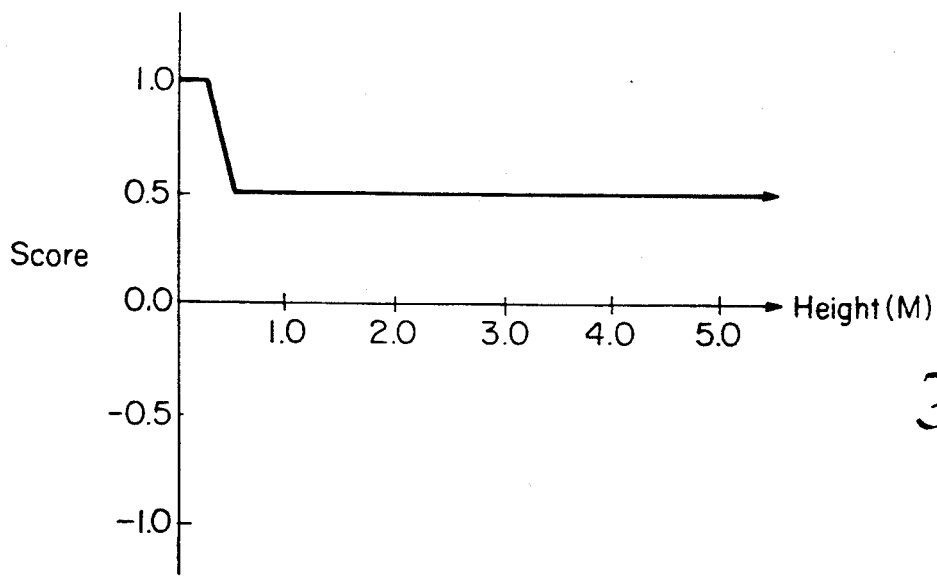

FIG. 5b shows the indexed scoring function $s_2(a)$, i.e., s(a,2) of FIG. 2, which encodes the scores for ground values surrounding the target (in practice, one treats the ground surface in the immediate vicinity of an object as a part of the object). Maximal scores are returned for values within 0.25 m of ground, intermediate scores out to 0.5 m and an ambiguous score of 0.5 for heights above 0.5 m (again, accommodating possibly occluding surfaces).

The reason the present invention permits negative numbers to be returned from the height distribution (scoring) function as shown in FIG. 5a is related to the practice of including neighboring ground as part of the target in the fuzzy template. Preferably, the situation that generates a fuzzy membership value of 0.0 is a patch of bare ground (by definition, ground height=0). However as is evident in FIG. 5b, locations in the template where ground is expected return a value of 1.0. Looking again at FIG. 4, consider what would happen if that template were superimposed on a uniform area of bare ground. All template locations with index 0 would return a score of 1.0. Consequently, in order for bare ground to result in a score of 0.0, $s_1(a)$ must return sufficiently negative scores for an input height=0 to balance the positive scores contributed by $s_0(a)$.

Figure 5C:
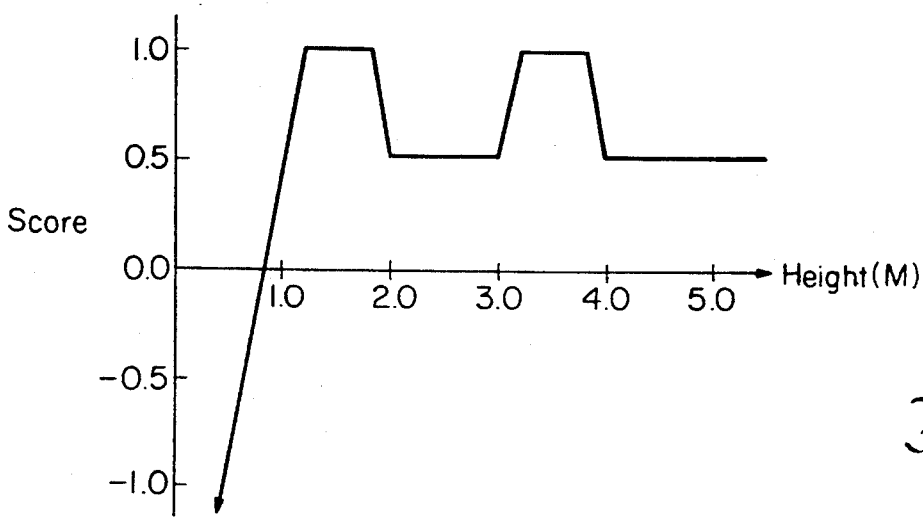

One further example of an indexed scoring function illustrates how object articulation or multiple object configurations can be handled. Consider a tank with an elongated turret. Assume that the hull height is 1.5 m and the turret height is 3.5 m. Some locations on the hull near the turret may or may not be occluded depending on the turret azimuth. FIG. 5c contains a bimodal height distribution for such a location near the turret: one maximum scoring range corresponds to the height of the turret, the other maximum scoring range corresponds to the height of the hull. In particular, FIG. 5c shows a scoring function for a location of an articulated object &with two possible surfaces at 1.5 m and 3.0 m above ground.

Although range information is generally necessary for purposes of scaling, scoring functions can accommodate sensory modalities other than height as long as reasonably accurate range information is available. For example, thermal distribution functions may be used as scoring functions to process passive infrared images.

According to the foregoing, in situations where the effects of scaling or rotation can be minimized and the number of objects to be searched for is small, the present invention (functional shape matching in general and fuzzy template correlation in particular) is already computationally practical. The fuzzy template correlation embodiment of the present invention works best in situations where the objects to be modeled are either rigid or are articulated with rigid parts having known pivot points. Fuzzy template correlation excels in its ability to perform shape matching in images containing significant amounts of clutter and/or occlusion (i.e. natural scenes) and for objects that have an uncertain or variable image signature.

The following is an incomplete list of possible commercial (non-military) applications for fuzzy templates of the present invention:

1. Low level vision tools: Traditional shape matching techniques are currently used in image processing for such things as edge detection, image segmentation, and feature extraction. A likely possibility is that wherever these techniques are already in use, fuzzy templates have the potential of doing it better.

2. Visual inspection:

(a) Quality control of manufactured items (e.g., printed circuit boards).

(b) searching for concealed weapons in carry-on luggage at airports.

3. Free moving robots/autonomous navigation systems.

4. Visual feedback for process control.

5. Character (or pattern) recognition.

6. Medical imaging.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example multiple templates g may be employed for processing multiple measurements (i.e. height, temperature, weight, etc.) at the same time through data fusion. Further two templates g may be employed for articulating subjects in that case, a first (dominant) template is employed to recognize a main portion of the input image. From the main portion a pivot point is determined. The second template is then employed to recognize/detect the articulating portion of the subject out of image portions within the pivoting range of the determined pivot point.

Functions g and s could be modified as a function of the location $x$ being probed. The modification can be specified a priori by specifying g and s as the 2-dimensional function $g(\bar{x}, \bar{y})$ and the 3-dimensional function $s(\bar{x}, a, b)$, respectively (this processing strategy is usually termed "space-variant"). The modification can also be determined dynamically by adjusting g and s as a function of the values of the image f in some neighborhood of $\bar{x}$ (this processing strategy is usually termed "adaptive"). More generally, the functions $\bar{g}$ and s could be modified arbitrarily as each location $\bar{x}$ in f is probed.

We claim:

1. Computer apparatus for shape matching comprising:
    a digital processor;
    a template coupled to the digital processor and indicative of a desired shape, the template having a plurality of points, each point having a predetermined value;
    a working memory area coupled to the digital processor for holding a subject image formed of a plurality of points, each point of the image having a respective measurement value; and
    processor means executable by the digital processor for matching the template to a subset of points of the subject image held in the working memory area and generating an output image having a plurality of points with each output image point having a respective output image value, for each point in the subject image, the processor means determining the output image value at a corresponding point in the output image according to a scoring function that operates on measurement values of a subset of points in the subject image and predetermined values of points in the template, the measurement values of a subset of the points for the subject image being derived from a first function and the predetermined values of points in the template being derived from a second function, the values derived from the first function and the second function being used in pairs as inputs to the scoring function that encodes physical characteristics of the desired shape indicated by the template and that returns a numeric score reflecting a degree of correlation between the subject image and the template.

2. Computer apparatus as claimed in claim 1 wherein the template further provides, for each template point, an arbitrarily complex function used by the processor means as an input to the scoring function to determine the values at the output image points.

3. Computer apparatus as claimed in claim 1 wherein the scoring function is formed of a plurality of one variable functions.

4. Computer apparatus as claimed in claim 3 wherein the plurality of one variable functions includes one function for each possible predetermined value of a template point.

5. Computer apparatus as claimed in claim 1 wherein the processor means further determines the output image value at a corresponding output image point according to an arbitrarily complex operation on a multiplicity of results from the scoring function.

6. Computer apparatus as claimed in claim 5 wherein the operation (a) includes an average of the results from the scoring function over the number of points in the template, and (b) generates an output image point value in one of the rang e0 to 1 and a set of values mapped to the range 0 to 1.

7. Computer apparatus as claimed in claim 5 wherein:
    for each point in the subject image, a multiplicity of templates are used by the processor means, each template (i) having a plurality of points with respective predetermined values, and (ii) providing a respective scoring function of measurement values of a subset of subject image points and predetermined values of points in the template; and
    the operation includes a merge of operation results across the multiplicity of templates.

8. Computer apparatus as claimed in claim 1 wherein for each, point in the subject image, the template and scoring function are defined according to the subject image point.

9. Computer apparatus as claimed in claim 1 wherein for each point in the subject image, the template and scoring function are defined according to values of image points neighboring the subject image point.

10. Computer apparatus as claimed in claim 1 wherein:
    the template includes (i) a first template indicative of shape of a main part of the subject image, and (ii) a second template indicative of shape of a pivotal part that pivots from a point in the main part in the subject image; and
    the processing means matches shape of the first template to a subset of points of the subject image to determine a pivot point in the subject image, and matches shape of the second template to subsets of points of the subject image within pivoting range from the determined pivot point to determine articulating portions of the subject image.

11. In a computer system having (i) a digital processor, (ii) a template coupled to the digital processor for indicating a desired shape and having a plurality of points, each point having a predetermined value, and (iii) a working memory area coupled to the digital processor for holding a subject image formed of a plurality of points, each image point having a respective measurement value, computer apparatus comprising:

processor means executable by the digital processor for matching the template to a subset of points of the subject image held in the working memory area and generating an output image having a plurality of points with each output image point having a respective output image value, for each point in the subject image, the processor means determining the output image value at a corresponding point in the output image according to a scoring function that operates on measurement values of a subset of points in the subject image and predetermined values of points in the template, the measurement values of a subset of points for the subject image being derived from a first function and the predetermined values of points in the template being derived from a second function, the values derived from the first function and the second function being used in pairs as inputs to the scoring function that encodes physical characteristics of the desired shape indicated by the template and that returns of numeric score reflecting a degree of correlation between the subject image and the template.

12. Computer apparatus as claimed in claim 11 wherein the scoring function is formed of a plurality of one variable functions.

13. Computer apparatus as claimed in claim 12 wherein the plurality of single variable functions include one function for each possible predetermined value of a template point.

14. Computer apparatus as claimed in claim 11 wherein the processor means further determines output image value at a corresponding output image point according to an arbitrarily complex operation on a multiplicity of results from the scoring function.

15. Computer apparatus as claimed in claim 14 wherein the operation (a) includes an average of the results from the scoring function over the number of points in the template, and (b) generates an output image point value in one of the range 0 to 1 and a set of values mapped to the range 0 to 1.

16. Computer apparatus as claimed in claim 14 wherein the template includes a multiplicity of templates and the operation includes a merge of operation results across templates.

17. Computer apparatus as claimed in claim 11 wherein for each point in the subject image, the template and scoring function are defined according to the subject image point.

18. Computer apparatus as claimed in claim 11 wherein for each point in the subject image, the template and scoring function are defined according to values of image points neighboring the subject image point.

19. Computer apparatus as claimed in claim 11 wherein:
the template includes (i) a first template indicative of shape of a main part of the subject image, and (ii) a second template indicative of shape of a pivotal part that pivots from a point in the main part in the subject image; and
the processing means matches shape of the first template to a subset of points of the subject image to determine a pivot point in the subject image, and matches shape of the second template to subsets of points of the subject image within pivoting range from the predetermined pivot point to determine articulating portions of the subject image.

20. In a computer system having a processor, a method for shape matching comprising the steps of:
providing to the processor at least one template of a desired shape, the template having a plurality of points each point having a predetermined value;
holding in a working memory area of the processor, a subject image formed of a plurality of points, each image point having a respective measurement value;
determining for each point in the subject image a value at a corresponding point in an output image according to a scoring function that operates on measurement values of a subset of image points and the predetermined values of points in the template, the measurement values of a subset of points for the subject image being derived from a first function and the predetermined values of points in the template being derived from a second function, the values derived from the first function and the second function are used in pairs as inputs to the scoring function that encodes physical characteristics of the desired shape indicated by the template and that returns a numeric score reflecting a degree of correlation between the subject image and the template;
applying a mathematical operation of the numeric scores generated from the scoring function;
matching the shape of the template to a subset of points of the subject image held in the working memory area according to the mathematical operation and the scoring function; and
generating the output image having a plurality of points, each output image point having the respective value determined by the scoring function and mathematical operation.

21. A method as claimed in claim 20 wherein the step of determining values of a corresponding point in the output image includes:
using a plurality of one variable functions to define the scoring function.

22. A method as claimed in claim 20 wherein the step of mathematically operating on results includes (1) averaging the results from the scoring function over the number of points in the template, and (2) clipping the average to a value in the range 0 to 1 to define a corresponding output image point value.

23. A method as claimed in claim 22 wherein:
the step of providing at least one template includes providing a multiplicity of templates, each template (i) having a plurality of points with respective predetermined values, and (ii) providing a respective arbitrarily complex function of measurement values of a subset of subject image points and predetermined values of points in the template; and
the step of determining value at a corresponding point includes merging operation results across the templates.

24. A method as claimed in claim 20 wherein:
the step of providing a template includes providing (i) a first template indicative of shape of a main part of the subject image, and (ii) a second template indicative of shape of a pivotal part that pivots from a point in the main part in the subject image; and
the step of determining includes matching shape of the first template to a subset of points of the subject image to determine a pivot point in the subject image, and matching shape of the second template to subsets of points of the subject image within pivoting range from the determined pivot point to determine articulating portions of the subject image.

25. Computer apparatus for shape matching comprising:
   a digital processor;
   a template coupled to the digital processor and indicative of a desired shape, the template having a plurality of points wherein each point has a predetermined value, the template including (i) a first template indicative of a shape of a main part of the subject image, and (ii) a second template indicative of a shape of a pivotal part that pivots from a point in the main part in the subject image;
   a working memory area coupled to the digital processor for holding a subject image formed of a plurality of points, each point of the image having a respective measurement value; and
   processor means executable by the digital processor for matching a the template to a subset of points of the subject image held in the working memory area, the processing means matching the shape of the first template to a subset of points of the subject image to determine a pivot point in the subject image, and matching the shape of the second template to subsets of points of the subject image within pivoting range from the determined pivot point to determine articulating portions of the subject image, said matching generating an output image having a plurality of points and each output image point having a respective output image value, for each point in the subject image, the processor means determining the output image value at a corresponding point in the output image according to a scoring function that operates on measurement values of a subset of points in the subject image and predetermined values of points in the template.

26. In a computer system having (i) a digital processor for indicating a desired shape and having a plurality of points, each point having a predetermined value, the template including a first template indicative of a shape of a main part of the subject image, and a second template indicative of a shape of a pivotal part that pivots from a point in the main part in the subject image and (iii) a working memory area coupled to the digital processor for holding a subject image formed of a plurality of points, each image point having a respective measurement value, computer apparatus comprising:
   processor means executable by the digital processor for matching the template to a subset of points of the subject image held in the working memory area, the processor matching the shape of the first template to a subset of points of the subject image to determine a pivot point in the subject image, and matching the shape of the second template to subset of points of the subject image within pivoting range from the determined pivot point to determine articulating portions of the subject image, said matching generating an output image having a plurality of points, each output image points having a respective output image value, for each point in the subject image, the processor means determining the output image value at a corresponding point in the output image according to a scoring function that operates on measurement values of a subset of points in the in the template, measurement values of a subset of points for the subject image being defined by a first function having at least one variable, and the predetermined values of points in the template being defined by a second function having a variable in common with one of the variables of the first function, the first function and the second function being operands, respectively, for the scoring function.

27. In a computer system having a processor, a method for shape matching comprising the steps of:
   providing to the processor at least one template of a desired shape, the template having a plurality of points each point having a predetermined value, the template including a first template indicative of a shape of the subject image, and a second template indicative of a shape of a pivotal part that pivots from a point in the main part in the subject image;
   holding in a working memory area of the processor, a subject image formed of a plurality of points, each image point having a respective measurement value;
   determining for each point in the subject image a value at a corresponding point in an output image according to a scoring function that operates on measurement values of a subset of image points and the predetermined values of points in the template, measurement values of a subset of points for the subject image being defined by a first function having at least one variable, and the predetermined values of points in the template being defined by a second function having a variable in common with one of the variables of the first function, the first function and the second function being used as operands, of the scoring function;
   matching the shape of the template to a subset of points of the subject image held in the working memory area, the shape of the first template is matched to a subset of points of the subject image to determine a pivot point in the subject image, and the shape of the second template is matched to a subset of points of the subject image within pivoting range from the determined pivot point to determine articulating portions of the subject image; and
   generating the output image having a plurality of points, each output image point having the respective value determined by the scoring function.

28. Computer apparatus for shape matching comprising:
   a digital processor;
   a template coupled to the digital processor and indicative of a desired shape, the template having a plurality of points, each point having a predetermined value;
   a working memory area coupled to the digital processor for holding a subject image formed of a plurality of points, each point of the image having a respective measurement value; and
   processor means executable by the digital processor for matching the template to a subset of points of the subject image held in the working memory area and generating an output image having a plurality of points with each output image point having a respective output image value, for each point in the subject image, the processor means determining the output image value at an output image point corresponding to a subject image point, the output image values reflecting a degree of match between values of the subset of points in the subject image and values of points in the template, wherein each point in the subset of points in the subject image corresponds to a point in the template, the degree of match being obtained by applying an arbitrary operation to a set of numeric scores generated by a scoring function, said scoring function operating on the measurement values of the subset of points in the subject image and the predetermined values of points in the template to produce a numeric score reflecting a degree of correlation between subset of points in the template and corresponding points in the subject image, the measurement values of the subset of points for the subject image being derived from a first function and the predetermined values of points in the template being derived from a second function, the values derived from the first function and the second function being used in pairs as inputs to the scoring function for encoding expectations of measurement values for points in the subject image corresponding to subset of points in the template.

* * * * *

UNITED STATES PATENT AND TRADEMARK OFFICE
CERTIFICATE OF CORRECTION

PATENT NO. : 5,222,155
DATED : June 22, 1993
INVENTOR(S) : Richard L. Delanoy and Jacques G. Verly It is certified that error appears in the above-identified patent and that said Letters Patent is hereby corrected as shown below:

Column 9, Claim 1, line 24 of that claim after "of" (second occurence) and before "points" the term "the" should be deleted.

Column 10, Claim 6, line 5 of that claim after "the" change "rang e0" to read ---range 0---.

Column 10, Claim 8, line 2 of that claim after "each" delete the ",".

Column 11, Claim 11, line 28 of that claim after "returns" change "of" to read ---a---.

Column 13, Claim 25, line 17 of that claim after "matching" delete "a" (first occurrence).

Column 13, Claim 26, line 2 of that claim after "processor" and before "for" insert ---, (ii) a template coupled to the digital processor---.

Column 13, Claim 26, line 23 of that claim after "image" change "points" to read ---point---.

Column 13, Claim 26, line 29 of that claim after "the" (first occurrence) insert ---subject image and predetermined values of points---.

Signed and Sealed this

Fifth Day of April, 1994

Attest:

BRUCE LEHMAN

Attesting Officer

Commissioner of Patents and Trademarks